US012788679B2

(12) United States Patent
Panchal et al.

(10) Patent No.: US 12,788,679 B2
(45) Date of Patent: Nov. 10, 2026

(54) METHODS AND ASSEMBLIES FOR CONTROL OF FORMATION OF NITROSAMINE IMPURITIES IN SOLID ACTIVE PHARMACEUTICAL INGREDIENTS

(71) Applicant: OLON S.p.A., Rodano (IT)

(72) Inventors: Natwar Panchal, Mahad (IN); Madhu Sadashivaiah, Mahad (IN); Venu Babu Goriparthi, Mahad (IN); Sanjani Vangule, Mahad (IN); Sandip Pawar, Mahad (IN)

(73) Assignee: OLON S.P.A., Rodano (IT)

( * ) Notice: Subject to any disclaimer, the term of this patent is extended or adjusted under 35 U.S.C. 154(b) by 117 days.

(21) Appl. No.: 18/881,345

(22) PCT Filed: Jul. 6, 2023

(86) PCT No.: PCT/IB2023/056982
§ 371 (c)(1),
(2) Date: Jan. 6, 2025

(87) PCT Pub. No.: WO2024/009248
PCT Pub. Date: Jan. 11, 2024

(65) Prior Publication Data

US 2026/0000577 A1 Jan. 1, 2026

(30) Foreign Application Priority Data

Jul. 8, 2022 (IT) ........................ 102022000014476

(51) Int. Cl.
*A61J 1/10* (2006.01)
*B65B 31/02* (2006.01)
(Continued)

(52) U.S. Cl.
CPC ............... *A61J 1/10* (2013.01); *B65B 31/024* (2013.01); *B65B 55/00* (2013.01); *B65D 77/04* (2013.01);
(Continued)

(58) Field of Classification Search
None
See application file for complete search history.

(56) References Cited

U.S. PATENT DOCUMENTS 4,174,320 A 11/1979 Bruzzese
2008/0173317 A1 * 7/2008 Robinson ........... B65D 81/2084 131/352
(Continued)

FOREIGN PATENT DOCUMENTS

CN 101486716 A 7/2009
WO 2022/271600 A1 12/2022

OTHER PUBLICATIONS

International Search Report and Written Opinion dated Sep. 21, 2023, in corresponding International Application No. PCT/IB2023/056982, 11 pages.
(Continued)

*Primary Examiner* — Tanzim Imam
(74) *Attorney, Agent, or Firm* — MH2 Technology Law Group LLP

(57) ABSTRACT

A packaging method for control of formation of nitrosamine in solid active pharmaceutical ingredient (API) may include: providing the solid API with a predetermined starting content of a nitrosamine selected from the group consisting of 1-methyl-4-nitrosopiperazine (less than or equal to 0.16 ppm), 1-cyclopentyl-4-nitrosopiperazine (less than or equal to 0.1 ppm), and N-Nitroso-3-azabicyclo[3.3.0]octane (less than or equal to 2 ppm); loading, under a first inert atmosphere, the API in a first bag that includes first thermoplastic
(Continued)

material, and closing the first bag; placing, under a second inert atmosphere, the closed first bag, a first oxygen-scavenging agent, and a first moisture-absorbing agent in a second bag that includes second thermoplastic material, and closing the second bag; and placing, under a third inert atmosphere, the closed second bag, a second oxygen-scavenging agent, and a second moisture-absorbing agent in a third bag that includes aluminium-based material, and sealing the third bag.

20 Claims, 1 Drawing Sheet

(51) Int. Cl.

| | |
|---|---|
| ***B65B 55/00*** | (2006.01) |
| ***B65D 77/04*** | (2006.01) |
| ***B65D 81/20*** | (2006.01) |
| ***B65D 81/26*** | (2006.01) |

(52) U.S. Cl.
CPC ....... *B65D 81/2084* (2013.01); *B65D 81/264* (2013.01)

(56) References Cited

U.S. PATENT DOCUMENTS

| | | | | |
|---|---|---|---|---|
| 2009/0071855 | A1* | 3/2009 | Bahuguna ............ | A61K 9/2018 206/438 |
| 2014/0158562 | A1* | 6/2014 | Ibert ...................... | A61K 47/02 206/213.1 |
| 2019/0142694 | A1* | 5/2019 | Di Naro ................ | A61J 1/1475 604/408 |

OTHER PUBLICATIONS

Cloëz et al., "N-nitrosamines and Tuberculosis Medicines Rifampicin and Rifapentine," Treatment Action Group, Feb. 2021, 14 pages.

* cited by examiner

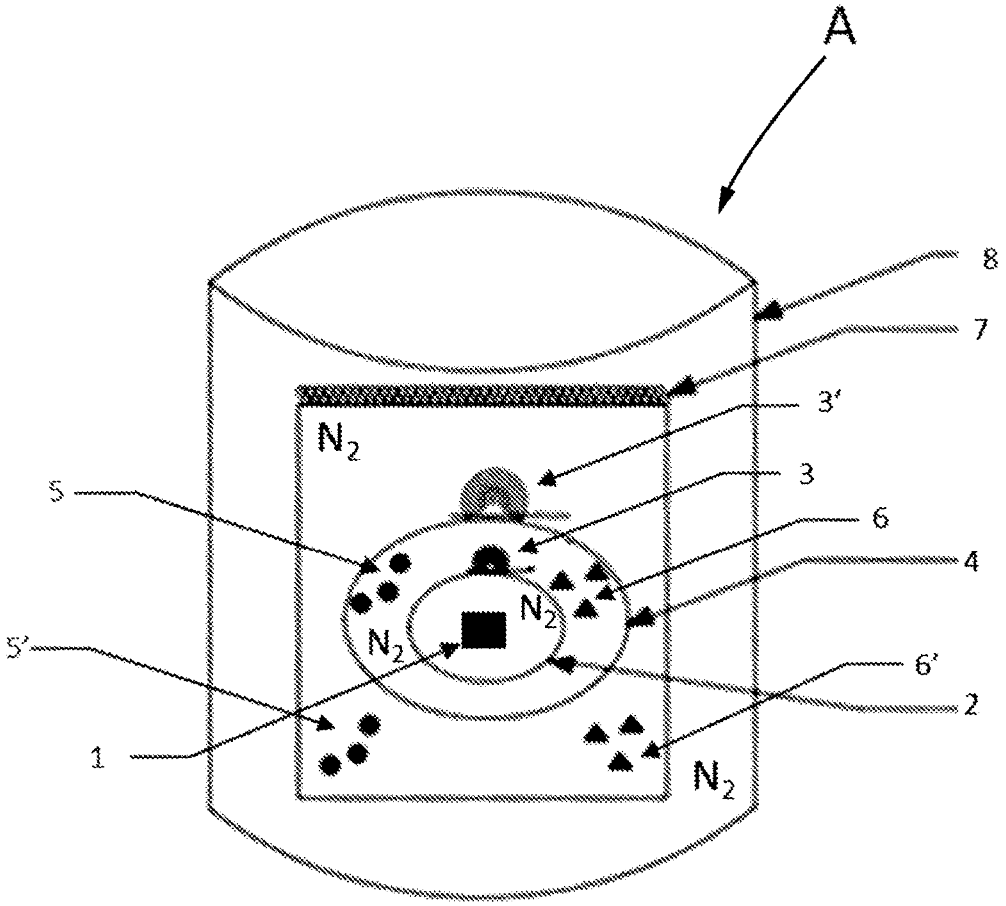
A
8
7
3'
$N_2$
5
3
6
4
$N_2$
$N_2$
5'
6'
2
1
$N_2$

METHODS AND ASSEMBLIES FOR CONTROL OF FORMATION OF NITROSAMINE IMPURITIES IN SOLID ACTIVE PHARMACEUTICAL INGREDIENTS

CROSS-REFERENCE TO RELATED APPLICATION(S)

This application is a national stage entry from International Application No. PCT/IB2023/056982, filed on Jul. 6, 2023, in the Receiving Office ("RO/IB") of the International Bureau of the World Intellectual Property Organization ("WIPO"), and published as International Publication No. WO 2024/009248 A1 on Jan. 11, 2024. International Application No. PCT/IB2023/056982 claims priority under 35 U.S.C. § 119 from Italian Patent Application No. 102022000014476, filed on Jul. 8, 2022, in the Italian Patent and Trademark Office ("IPTO"). The entire contents of the above-listed applications are incorporated herein by reference.

FIELD OF THE INVENTION

The present invention relates to the field of impurities control, in particular genotoxic impurities, in active pharmaceutical ingredients (APIs).

In particular, the present invention relates to a packaging method and assembly for the control of the formation of a nitrosamine, for example 1-methyl-4-nitrosopiperazine (MeNP), in a solid active pharmaceutical ingredient (API), for example rifampicin, during storage.

PRIOR ART

Nitrosamines, which are organic compounds having general formula $R_1R_2N—N{=}O$, are classified by the EMA (European Medicines Agency) ICH M7 (R1) (Assessment and control of DNA reactive (mutagenic) impurities in pharmaceuticals to limit potential carcinogenic risk) as class 1 impurities, "known mutagenic carcinogens", and by the International Agency for Research on Cancer (IARC) as 2A—"probable carcinogens".

Such compounds are known by-products of various synthetic processes, for example in the presence of nitrosating agents (such as nitrite salts in acidic conditions) and amines (secondary, tertiary or quaternary).

Traces of nitrosamines have been found in many active pharmaceutical ingredients (APIs) for use in humans. In recent years, this has led global regulatory agencies, such as the FDA (Food and Drug Administration) and EMA, to impose stringent limits on the tolerance thresholds for these impurities. Consequently, the companies holding Marketing Authorization of drugs containing active pharmaceutical ingredients, of chemical or biological origin, need an increasingly accurate and stringent review of their medicinal products and production processes thereof, in order to prevent or limit the nitrosamine content. The attention paid by regulatory agencies to the issue of genotoxic impurities, with particular reference to nitrosamines, represents a precautionary approach aimed at guaranteeing the safety and health of the patient (in line with the measures introduced by the revision of article 5, paragraph 3, of EMA Regulation (EC) No 726/2004, to limit the presence of nitrosamines in medicinal products for human use).

Rifampicin (shown below) belongs to the rifamycin class and is an antibiotic used primarily in the treatment of tuberculosis, as well as in the treatment of severe infections, such as bloodstream infections and leprosy.

Rifampicin can for example be obtained starting from rifamycin-S, via an oxazino intermediate, typically not isolated, and subsequent reaction with 1-amino-4-methylpiperazine (1-AMP), to obtain rifampicin (see synthetic scheme below). Synthetic processes of this type are known in the literature, see for example U.S. Pat. No. 4,174,320 and CN101486716.

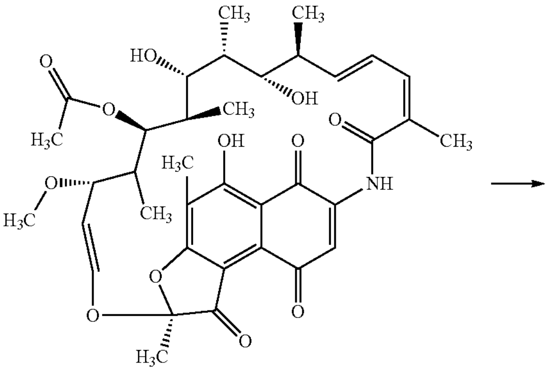

Rifamycin-S

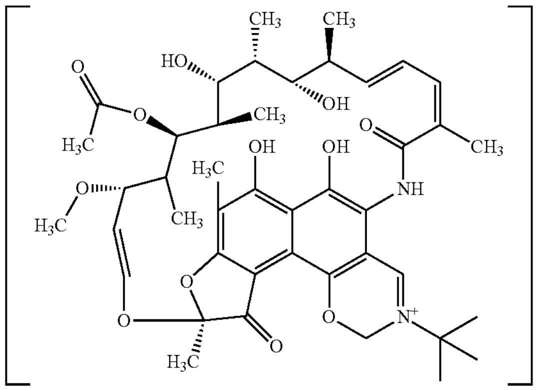

Oxazino

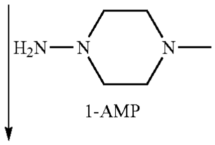

1-AMP

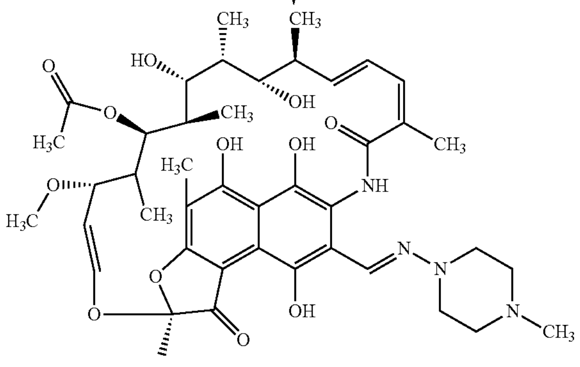

Rifampicin

Traces of nitrosamines, particularly 1-methyl-4-nitrosopiperazine (MeNP), have recently been detected in commercially available batches of rifampicin. It is known that the presence of this genotoxic impurity derives from the use of 1-AMP in the production process of rifampicin, as well as from the oxidation of degradation products of rifampicin itself.

The FDA proposes 96 ng/day as the maximum daily intake of MeNP. With particular reference to rifampicin, from this data and considering the maximum daily dose which corresponds to 600 mg/day, the maximum MeNP threshold considered acceptable in the active ingredient corresponds to 0.16 parts per million (ppm; Sandrine Cloëz and Mike Frick, N-nitrosamines and Tuberculosis Medicines Rifampicin and Rifapentine, February 2021).

In fact, in August 2020 the FDA issued a note in which the acceptable limits of MeNP in rifampicin were set at 0.16 ppm. Similarly, traces of 1-cyclopentyl-4-nitrosopiperazine (CPNP), another compound pertaining to the nitrosamine class, have been found in the antibiotic rifapentine, prompting the FDA to issue a similar note to that regarding rifampicin and MeNP. The threshold level set for CPNP in rifapentine is of 0.1 ppm.

Traces of a nitrosamine, specifically N-nitroso-3-azabicyclo[3.3.0]octane, have also been found in the anti-diabetic drug gliclazide: the threshold level set for this impurity is of 2 ppm.

Daily intake limit values for a number of nitrosamines have also been set by the EMA: from these values, depending on the daily dosage of the API to administer, a threshold value for the content of impurities in the API can be calculated as detailed above.

Thus there is a need for active pharmaceutical ingredients with controlled amounts of genotoxic impurities, in particular of nitrosamines.

SUMMARY OF THE INVENTION

The Applicant has addressed the need for active pharmaceutical ingredients with controlled amounts of nitrosamines.

During extensive analysis and experimentation, the Applicant has noticed that the amount of nitrosamines in a purified active pharmaceutical ingredient tends to increase over time after purification. This can therefore result in an API, which has been purified to comply with the thresholds given by regulatory agencies in terms of impurities, becoming non-compliant over time during storage even before the preparation of the actual pharmaceutical dosage form.

The Applicant has thus tackled the problem of providing active pharmaceutical ingredients substantially free of nitrosamines with longer shelf life. In particular, the Applicant has tackled the problem of providing active pharmaceutical ingredients having a content of nitrosamines that would not vary over time under typical storage conditions.

Therefore, in a first aspect, the present invention relates to a packaging method for the control of the formation of a nitrosamine in a solid active pharmaceutical ingredient (API), comprising the steps of:

a) providing a solid API with a predetermined starting content of a nitrosamine selected from the group consisting of 1-methyl-4-nitrosopiperazine, 1-cyclopentyl-4-nitrosopiperazine and N-Nitroso-3-azabicyclo[3.3.0]octane;

b) loading, under inert atmosphere, said API in a first bag comprising a thermoplastic material and closing said first bag;

c) placing, under inert atmosphere, said closed first bag, a first oxygen-scavenging agent and a first moisture absorbing agent in a second bag comprising a thermoplastic material, and closing said second bag;

d) placing, under inert atmosphere, said closed second bag, an oxygen-scavenging agent and a moisture absorbing agent in a third bag comprising an aluminium-based material and sealing said third bag;

wherein when said nitrosamine is 1-methyl-4-nitrosopiperazine then said predetermined starting content is equal to or lower than 0.16 ppm, when said nitrosamine is 1-cyclopentyl-4-nitrosopiperazine then said predetermined starting content is equal to or lower than 0.1 ppm, and when said nitrosamine is N-Nitroso-3-azabicyclo[3.3.0]octane then said predetermined starting content is equal to or lower than 2 ppm.

In a second aspect the present invention relates to an assembly for the control of the formation of a nitrosamine in a solid active pharmaceutical ingredient (API), the assembly comprising:

a first bag comprising a thermoplastic material, containing a solid API having a predetermined starting content of a nitrosamine selected from the group consisting of 1-methyl-4-nitrosopiperazine, 1-cyclopentyl-4-nitrosopiperazine and N-Nitroso-3-azabicyclo[3.3.0]octane, filled with an inert gas and closed;

a second bag comprising a thermoplastic material, containing said first bag, and provided with a first oxygen-scavenging agent and a first moisture absorbing agent, filled with an inert gas and closed; and a third bag comprising an aluminium-based material, containing said second bag, provided with a second oxygen-scavenging agent and a second moisture absorbing agent, filled with an inert gas and sealed;

wherein when said nitrosamine is 1-methyl-4-nitrosopiperazine (MeNP) then said predetermined starting content is equal to or lower than 0.16 ppm, when said nitrosamine is 1-cyclopentyl-4-nitrosopiperazine then said predetermined starting content is equal to or lower than 0.1 ppm, and when said nitrosamine is N-Nitroso-3-azabicyclo[3.3.0]octane then said predetermined starting content is equal to or lower than 2 ppm.

Finally, in a third aspect, the present invention relates to the use of an assembly for the control of the formation of a nitrosamine in a solid active pharmaceutical ingredient (API) having a predetermined starting content of a nitrosamine selected from the group consisting of 1-methyl-4-nitrosopiperazine, 1-cyclopentyl-4-nitrosopiperazine and N-Nitroso-3-azabicyclo[3.3.0]octane, wherein the assembly comprises:

a closable first bag (2) comprising a thermoplastic material, a closable second bag (4) comprising a thermoplastic material, a sealable third bag (7) comprising an aluminium-based material, a first oxygen-scavenging agent and a first moisture absorbing agent, and a second oxygen-scavenging agent and a second moisture absorbing agent, wherein the use comprises, under inert atmosphere:

loading the solid active pharmaceutical ingredient in said first bag (2) and closing the first bag (2) after being loaded;

placing the closed first bag (2), the first oxygen-scavenging agent (6) and the first moisture absorbing agent (5) in the second bag (4), and closing the second bag (4) after placing;

placing the closed second bag (4), the second oxygen-scavenging agent (6') and the second moisture absorbing agent (5') in the third bag (7) and sealing the third bag (7) after placing; and wherein when said nitrosamine is 1-methyl-4-nitrosopiperazine (MeNP) then said predetermined starting content is equal to or lower than 0.16 ppm, when said nitrosamine is 1-cyclopentyl-4-nitrosopiperazine then said predetermined starting content is equal to or lower than 0.1 ppm, and when said nitrosamine is N-Nitroso-3-azabicyclo[3.3.0]octane then said predetermined starting content is equal to or lower than 2 ppm.

In particular, according to the present invention the use of the assembly and the method as defined above allow to maintain the amount of said nitrosamine in said API at a level equal to or lower than said predetermined starting content for at least six months of storage.

BRIEF DESCRIPTION OF THE FIGURES

The description is illustrated here with reference to the attached drawing, provided solely by way of example and not limiting the invention.

FIG. 1 shows a schematic representation of an embodiment of the assembly according to the present invention.

DETAILED DESCRIPTION OF THE INVENTION

Definitions

In the present text, the term "to control/controlling" is intended to also include the terms "prevent" and "inhibit". That is to mean that the expression "control of the formation of a nitrosamine" is intended as keeping said nitrosamine content below a predefined level, by preventing and/or inhibiting its formation.

In the present text the expression "starting content" is intended to mean the amount of a nitrosamine present in the API right after purification, i.e. before being placed in the assembly. Said purification can be performed via any methodology able to provide an API with the required content of said nitrosamine, e.g. equal to or lower than 0.16 ppm in the case of 1-methyl-4-nitrosopiperazine (MeNP). An example of such a methodology is given, by way of non-limiting example, in the detailed description and in the experimental section of the present text.

For the purposes of the present invention, the term "assembly" is intended to refer to a packaged product, that is to mean the API packaged under inert atmosphere in a packaging kit.

In the present text the term "bag" is intended to refer to a flexible container, such as a sachet, a pouch, a sack, etc., not limited to a specific shape or size.

For the purposes of the present invention, the expression "closed in an airtight manner" is intended to mean closed in such a way that the item is rendered impermeable to air or nearly so.

For the purposes of the present invention, the expression "filled with an inert gas" is intended to mean that each bag is purged and substantially saturated with an inert gas. It does not however exclude the possibility of traces of other gases, i.e. oxygen, to be present.

In the present text, the terms "crude active ingredient" and "crude rifampicin" are intended to mean an active ingredient, in particular rifampicin, obtained from a preparation process prior to the purification process, thus comprising one or more impurities, in particular comprising an amount of a nitrosamine (such as 1-methyl-4-nitrosopiperazine) higher than a predetermined level (such as 0.16 ppm in the case of 1-methyl-4-nitrosopiperazine).

For the purposes of the present invention the term "oxygen-scavenging agent" is intended to mean a chemical, or a composition comprising chemicals, able to reduce or completely remove oxygen from the surrounding atmosphere.

For the purposes of the present invention the term "moisture absorbing agent" is intended to mean a hygroscopic substance or mixture of substances, in particular desiccants, able to induce or sustain a state of dryness (desiccation) in the surrounding atmosphere.

DETAILED DESCRIPTION

Therefore, in a first aspect, the present invention relates to a packaging method for the control of the formation of a nitrosamine in a solid active pharmaceutical ingredient (API), comprising the steps of:

a) providing a solid API with a predetermined starting content of a nitrosamine selected from the group consisting of 1-methyl-4-nitrosopiperazine, 1-cyclopentyl-4-nitrosopiperazine and N-Nitroso-3-azabicyclo[3.3.0]octane;

b) loading, under inert atmosphere, said API in a first bag comprising a thermoplastic material and closing said first bag;

c) placing, under inert atmosphere, said closed first bag, a first oxygen-scavenging agent and a first moisture absorbing agent in a second bag comprising a thermoplastic material, and closing said second bag;

d) placing, under inert atmosphere, said closed second bag, a second oxygen-scavenging agent and a second moisture absorbing agent in a third bag comprising an aluminium-based material and sealing said third bag;

wherein when said nitrosamine is 1-methyl-4-nitrosopiperazine (MeNP) then said predetermined starting content is equal to or lower than 0.16 ppm, when said nitrosamine is 1-cyclopentyl-4-nitrosopiperazine then said predetermined starting content is equal to or lower than 0.1 ppm, and when said nitrosamine is N-Nitroso-3-azabicyclo[3.3.0]octane then said predetermined starting content is equal to or lower than 2 ppm.

In a second aspect the present invention relates to an assembly for the control of the formation of a nitrosamine in a solid active pharmaceutical ingredient (API), the assembly comprising:

a first bag comprising a thermoplastic material, containing a solid API having a predetermined starting content of a nitrosamine selected from the group consisting of 1-methyl-4-nitrosopiperazine, 1-cyclopentyl-4-nitrosopiperazine and N-Nitroso-3-azabicyclo[3.3.0]octane, filled with an inert gas and closed;

a second bag comprising a thermoplastic material, containing said first bag, provided with a first oxygen-scavenging agent and a first moisture absorbing agent, filled with an inert gas and closed; and a third bag comprising an aluminium-based material, containing said second bag, provided with a second oxygen-scavenging agent and a second moisture absorbing agent, filled with an inert gas, and sealed;

wherein when said nitrosamine is 1-methyl-4-nitrosopiperazine (MeNP) then said predetermined starting content is equal to or lower than 0.16 ppm, when said nitrosamine is 1-cyclopentyl-4-nitrosopiperazine then said predetermined starting content is equal to or lower than 0.1 ppm, and when said nitrosamine is N-Nitroso-3-azabicyclo[3.3.0]octane then said predetermined starting content is equal to or lower than 2 ppm.

According to a preferred aspect, said API is selected from rifampicin, rifapentine, gliclazide, or salts or hydrates thereof. In a particularly preferred aspect, said API is rifampicin or salts or hydrates thereof.

According to alternative aspects of the present invention, in the method and the assembly disclosed above, said API is rifampicin and said nitrosamine is 1-methyl-4-nitrosopiperazine (MeNP); or said API is rifapentine and said nitrosamine is 1-cyclopentyl-4-nitrosopiperazine; or said API is gliclazide and said nitrosamine is N-Nitroso-3-azabicyclo[3.3.0]octane. In a particularly preferred aspect, said API is rifampicin and said nitrosamine is 1-methyl-4-nitrosopiperazine (MeNP).

Thus, in an embodiment, the present invention in a first aspect is a packaging method for the control of 1-methyl-4-nitrosopiperazine (MeNP) formation in solid rifampicin, comprising the steps of:

a) providing a solid rifampicin with a starting content of MeNP equal to or lower than 0.16 ppm;
b) loading, under inert atmosphere, said rifampicin in a first bag comprising a thermoplastic material and closing said first bag;
c) placing, under inert atmosphere, said closed first bag, a first oxygen-scavenging agent and a first moisture absorbing agent in a second bag comprising a thermoplastic material, and closing said second bag;
d) placing, under inert atmosphere, said closed second bag, a second oxygen-scavenging agent and a second moisture absorbing agent in a third bag comprising an aluminium-based material and sealing said third bag.

Similarly, according to an embodiment, the present invention in a second aspect is an assembly for the control of 1-methyl-4-nitrosopiperazine (MeNP) formation in solid rifampicin, the assembly comprising:

a first bag comprising a thermoplastic material, containing a solid rifampicin having a starting content of MeNP equal to or lower than 0.16 ppm, filled with an inert gas and closed;

a second bag comprising a thermoplastic material, containing said first bag, provided with a first oxygen-scavenging agent and a first moisture absorbing agent, filled with an inert gas and closed; and a third bag comprising an aluminium-based material, containing said second bag, provided with a second oxygen-scavenging agent and a second moisture absorbing agent, filled with an inert gas and sealed.

Preferably, said solid API is in the form of a powder, such as a crystalline or an amorphous powder, or granules.

According to a preferred aspect, said content of MeNP is of from 0.01 to 0.16 ppm, preferably from 0.01 to 0.10 ppm, even more preferably from 0.01 to 0.05 ppm. According to another preferred aspect, said content of MeNP is of from 0.02 to 0.16 ppm, preferably from 0.02 to 0.10 ppm, even more preferably from 0.02 to 0.05 ppm.

According to an alternative preferred aspect, said content of 1-cyclopentyl-4-nitrosopiperazine is of from 0.01 to 0.1 ppm, preferably from 0.01 to 0.05 ppm. According to another preferred aspect, said content of 1-cyclopentyl-4-nitrosopiperazine is of from 0.02 to 0.1 ppm, preferably from 0.05 to 0.1 ppm.

According to a yet alternative preferred aspect, said content of N-Nitroso-3-azabicyclo[3.3.0]octane is of from 0.01 to 2 ppm, preferably from 0.01 to 1.5 ppm, even more preferably from 0.01 to 1 ppm. According to another preferred aspect, said content of N-Nitroso-3-azabicyclo[3.3.0]octane is of from 0.02 to 2 ppm, preferably from 0.25 to 2 ppm, even more preferably from 0.5 to 2 ppm.

Advantageously said first and second bags comprise or are essentially made of or consist of said thermoplastic material.

Preferably said thermoplastic material is a thermoplastic polyethylene-based material, such as high-density polyethylene (HDPE) or low-density polyethylene (LDPE). Particularly preferred is LDPE, as it is more flexible thus allowing the bags to be closed more efficiently in an optimal air-tight manner. Preferably, said thermoplastic material is antistatic. Therefore, in a particularly preferred aspect said thermoplastic material is antistatic LDPE.

Advantageously said first and second bags can comprise or be essentially made of the same or of different materials.

In a preferred aspect, said first and/or second bag comprises or is essentially made of a thin film of said thermoplastic material, for example having a thickness of about 0.05-0.20 mm.

Preferably said first and second bags are closed in an airtight manner by closing means such as metal or plastic strips, strings or ties, or by sealing, for example by thermal sealing. In a particularly preferred aspect, said first and second bags are twisted and tied in an airtight manner with a plastic strip.

Advantageously said third bag comprises or is essentially made of or consists of said aluminium-based material.

Preferably said third bag is an aluminium pouch, such as a gusset bag made of an aluminium foil laminated on both sides, i.e. internal and external sides, with polyester and/or polyethylene. Preferably, the material is non-permeable to oxygen and humidity.

In a preferred aspect, said third bag is sealed in an airtight manner for example it is heat-sealed. In an alternative aspect, said third bag is closed in an airtight manner by closing means such as metal or plastic strips, strings or ties.

Advantageously, the dimensions of said first, second and third bag, in particular the volume, are chosen depending on the amount of API to be packaged.

In a preferred aspect of the present invention, said assembly is then placed in a high-density polyethylene (HDPE) drum, optionally under inert atmosphere. In this preferred aspect, the method according to the present invention comprises a step e) of placing the sealed third bag in a HDPE drum, optionally under inert atmosphere, and closing said drum with a lid, optionally provided with an airtight seal.

Preferably, the inert atmosphere is an atmosphere substantially free of oxygen, for example substantially saturated with an inert gas such as nitrogen or argon or helium. Therefore, said first, second and third bags are filled with an inert gas preferably selected from nitrogen or argon or helium, thereby creating an inert atmosphere inside each bag.

According to a preferred aspect said inert atmosphere is an atmosphere with an amount of $O_2$ lower than 3% by volume, preferably lower than 1% by volume, even more preferably equal to or lower than 0.5% by volume.

According to another preferred aspect, said inert atmosphere has a relative oxygen density $<0.1$.

Typically, said inert atmosphere is obtained by purging the bag, or container, with the selected inert gas and then saturating the bag or container with said gas up until the time of closing or sealing the bag or container.

Advantageously, said first and second oxygen-scavenging agent can be the same or different, and said first and second moisture absorbing agent can be the same or different.

According to a preferred aspect said first and second oxygen-scavenging agent are independently selected from a mixture comprising iron powder, zeolite and chelated carbon; a mixture comprising iron powder and calcium hydroxide; a mixture comprising iron powder sodium chloride and activated carbo; and mixtures thereof. Preferably, said first and second oxygen-scavenging agent are both a mixture comprising iron powder, zeolite and chelated carbon.

According to a preferred aspect said first and second moisture absorbing agent are independently selected from silica gel, calcium chloride, activated molecular sieves, activated carbon, and mixtures thereof. Preferably, said first and second moisture absorbing agent are both silica gel.

Typically, said first and second oxygen-scavenging agent and said first and second moisture absorbing agent are individually contained in sachets or packets, such as porous sachets or packets. Advantageously, each of the abovementioned second and third bag can contain more than one sachet, or packet, of said oxygen-scavenging agent and said moisture absorbing agent. In each bag, the sachets, or packets, can contain the same or different oxygen-scavenging and moisture absorbing agents.

The amount of said first and second oxygen-scavenging agent and said first and second moisture absorbing agent is advantageously chosen depending on the amount of API to be packaged and on the dimensions of the bags used. By way of non limiting example, approximately 50 kg of API can be put in thermoplastic first and second bags of about 120 mm of length and 80 mm of width; the aluminium-based third bag can have dimensions of about 380-400 mm (width)×170-190 mm (depth of side gusset)×1265-1285 mm (Length); each of the second and third bag can contain three sachets of 5 g moisture absorbing agent and three sachets of 3000 $cm^3$ oxygen-scavenging agent.

FIG. 1 shows a schematic representation of a particular embodiment of the assembly A according to the present invention, wherein a solid active pharmaceutical ingredient (1) is placed in a first thermoplastic bag (2), specifically an antistatic LDPE bag, filled with nitrogen gas (indicated by the $N_2$ symbol in the FIGURE), twisted and tied in a substantially airtight manner with a plastic strip (3).

The first thermoplastic bag (2) is placed inside a second thermoplastic bag (4), specifically an antistatic LDPE bag, filled with nitrogen gas (indicated by the $N_2$ symbol in the FIGURE), and containing porous sachets of moisture absorbing agent (5) and porous sachets of oxygen-scavenging agent (6). The second thermoplastic bag (4) is also twisted and tied in a substantially airtight manner with a plastic strip (3').

The second thermoplastic bag (4) is placed inside a heat-sealed aluminium pouch (7), filled with nitrogen gas (indicated by the $N_2$ symbol in the FIGURE), also containing porous sachets of moisture absorbing agent (5') and porous sachets of oxygen-scavenging agent (6'). The aluminium pouch (7) is placed in a HDPE drum (8) also filled with nitrogen gas (indicated by the $N_2$ symbol in the FIGURE).

Without being bound to any theory, it is believed that the API degradation is prevented, or at least significantly inhibited, by creating, using an inert gas, and maintaining, thanks to the oxygen-scavenging and moisture absorbing agents, an atmosphere substantially free of oxygen and humidity, so that the amount of nitrosamine present in the API remains substantially constant over time.

Thus, in a third aspect the present invention relates to the use of an assembly for the control of the formation of a nitrosamine in a solid active pharmaceutical ingredient (API) having a predetermined starting content of a nitrosamine selected from the group consisting of 1-methyl-4-nitrosopiperazine, 1-cyclopentyl-4-nitrosopiperazine and N-Nitroso-3-azabicyclo[3.3.0]octane, wherein the assembly comprises:

- a closable first bag (2) comprising a thermoplastic material,
- a closable second bag (4) comprising a thermoplastic material,
- a sealable third bag (7) comprising an aluminium-based material,
- a first oxygen-scavenging agent and a first moisture absorbing agent, and
- a second oxygen-scavenging agent and a second moisture absorbing agent, wherein the use comprises, under inert atmosphere:

- loading the solid active pharmaceutical ingredient in said first bag (2) and closing the first bag (2) after being loaded;
- placing the closed first bag (2), the first oxygen-scavenging agent (6) and the first moisture absorbing agent (5) in the second bag (4), and closing the second bag (4) after placing;
- placing the closed second bag (4), the second oxygen-scavenging agent (6') and the second moisture absorbing agent (5') in the third bag (7) and sealing the third bag (7) after placing; and
- wherein when said nitrosamine is 1-methyl-4-nitrosopiperazine (MeNP) then said predetermined starting content is equal to or lower than 0.16 ppm, when said nitrosamine is 1-cyclopentyl-4-nitrosopiperazine then said predetermined starting content is equal to or lower than 0.1 ppm, and when said nitrosamine is N-Nitroso-3-azabicyclo[3.3.0]octane then said predetermined starting content is equal to or lower than 2 ppm.

Advantageously, said API can be selected from the list disclosed above. In a particularly preferred aspect, said API is rifampicin and said nitrosamine is 1-methyl-4-nitrosopiperazine (MeNP).

In particular, according to the present invention, the use of the assembly and the method as defined above allow to maintain the amount of said nitrosamine in said solid API at a level equal to or lower than said predetermined starting content for at least 3 months of storage, preferably at least 6 months of storage. That is to mean that the amount of said nitrosamine in the API can vary over time albeit without reaching a level higher than said predetermined starting content.

Therefore, in a particularly preferred aspect, the use of the assembly and the method according to the present invention allow to maintain the amount of 1-methyl-4-nitrosopiperazine (MeNP) in a solid rifampicin at a level equal to or lower than 0.16 ppm for at least 3 months of storage, preferably at least 6 months of storage.

As stated above, the API contained in the assembly and used in the packaging method of the present invention, is characterized by a predetermined starting amount of a nitrosamine. Thus said API derives from a synthesis and purification process and said starting amount of said nitrosamine is the amount measured at the end of the purification process, that is right before packaging.

Those of ordinary skill in the art will be able to select the suitable synthesis and purification process depending on the selected API.

What follows is a brief description of the purification process used according to a particularly preferred aspect of the present invention wherein the API is rifampicin, and the nitrosamine is 1-methyl-4-nitrosopiperazine (MeNP).

In this particularly preferred aspect of the present invention, the API is rifampicin with a 1-methyl-4-nitrosopiperazine (MeNP) content equal to or lower than 0.16 ppm obtained via a purification process comprising the following steps:

i. providing a mixture of crude rifampicin in an organic solvent;
ii. washing said mixture with an aqueous solution with pH from 2 to 7;
iii. adding at least one antioxidant to the mixture obtained from step ii);
iv. distilling said organic solvent under inert atmosphere;
V. crystallizing under inert atmosphere; and
vi. isolating rifampicin thus obtained under inert atmosphere.

Thus according to this particularly preferred aspect of the invention, the method for the storage of solid rifampicin comprises the purification steps i-vi above, which are then followed by the packaging steps b)-d):

b) loading, under inert atmosphere, said rifampicin obtained in step vi in a first bag made of a thermoplastic material and closing said first bag;
c) placing, under inert atmosphere, said closed first bag, an oxygen-scavenging agent and a moisture absorbing agent in a second bag made of a thermoplastic material, and closing said second bag;
d) placing, under inert atmosphere, said closed second bag, an oxygen-scavenging agent and a moisture absorbing agent in a third bag made of an aluminium-based material and sealing said third bag.

Advantageously, said mixture provided in step i) is the crude mixture obtained at the end of a process of preparation of rifampicin or a mixture obtained by dissolving a solid crude rifampicin in an organic solvent.

The organic solvent used in step i) could be selected from polar and non-polar aprotic solvents such as dichloromethane, ethyl acetate, 2-methyl tetrahydrofuran, methyl isobutyl ketone, toluene and mixtures thereof. The organic solvent could be a non-polar aprotic solvent. The non-polar aprotic solvent could be dichloromethane.

Step ii) is a liquid-liquid extraction phase in which said aqueous solution is added to the mixture of step i) obtaining a biphasic mixture; the two organic and aqueous layers are mixed, for example by stirring, and subsequently separated. The aqueous layer is then discarded, and the organic layer is used in step iii) of the above process. Step ii) can be repeated several times, for example 2-5 times: in this case at the end of each step ii) the organic layer obtained after the first washing could be recovered and washed again with said aqueous solution.

The aqueous solution used can have neutral pH, for instance being pure water at pH 7, or it can be water with a controlled pH, also defined as acidic water, with a pH from 2 to 6, for instance from 3 to 6, more preferably from 3 to 5.

This aqueous solution may comprise a pH adjusting agent selected from organic and inorganic acids. The pH adjusting agent could be an organic acid or a mixture of organic acids. It could be selected from acetic acid, formic acid, oxalic acid, and mixtures thereof. Preferably, the pH adjusting agent is acetic acid.

Advantageously, without binding to any theory, the addition of at least one antioxidant in step iii), before distillation (step iv), allows the inhibition of the formation of oxygen free radicals, thus avoiding the new formation of MeNP.

At least one antioxidant could be selected from ascorbic acid, ascorbyl-2-glucoside, ascorbyl-6-octanoate, ascorbyl-6-palmitate, cysteine, sodium metabisulphite, propyl gallate, butylhydroxyanisole, butylhydroxytoluene (BHT) and combinations thereof. In an aspect, said at least one antioxidant is ascorbic acid. According to another aspect, said at least one antioxidant is a mixture of ascorbic acid and butylhydroxytoluene (BHT).

Said antioxidant could be added in an amount of from 0.3% to 2% by weight, preferably from 0.5% to 1%. The amount of the antioxidant is calculated as a percentage by weight with respect to the weight of rifamycin S, the starting material used for the synthesis of rifampicin, or with respect to the weight of the crude rifampicin itself.

Preferably, the purification process is completely performed under inert atmosphere according to the definitions disclosed above.

EXPERIMENTAL SECTION

The present description will be better illustrated in the following examples which have only an illustrative and not limitative purpose.

Example 1—Purification of Crude Rifampicin

A mixture of crude rifampicin (approximately 0.15 mol) in dichloromethane was subjected to washing with an aqueous solution of acetic acid at pH 3.9-4.2 and subsequent stirring for 30 minutes. The mixture was then left to rest for 60 minutes and subsequently the organic phase was separated from the aqueous one.

The mixture thus obtained was heated to a temperature of about 45° C. and butylhydroxytoluene (0.1 g, 4.5*10^−4 moles) and ascorbic acid (0.52 g, 0.003 moles, 0.5% by weight with respect to the weight of the crude rifampicin) were added. The dichloromethane was then distilled at about 53° C. in inert atmosphere (under nitrogen saturation conditions).

The residue thus obtained was then dissolved, again in inert atmosphere, in previously heated acetone (200 ml) and the mixture was subjected to a second distillation in inert atmosphere, at a temperature of about 50-58° C.

The residue thus obtained was then crystallized with acetone in inert atmosphere (under nitrogen saturation conditions). In particular, under inert atmosphere, the residue was dissolved in acetone (520 ml) preheated to 53° C., the mixture was heated to reflux (about 55-59° C.) and kept at this temperature for 40-45 minutes, then slowly cooled down to a temperature between −5 and −20° C.

Pure rifampicin was then isolated by filtration in inert atmosphere (under nitrogen saturation conditions) and washed with 80 ml of cold acetone. The solid rifampicin obtained was then vacuum dried at 55° C.

Example 2—MeNP Content in Rifampicin Under Different Storage Conditions

Rifampicin obtained via the purification process of Example 1 was then placed in assemblies according to the invention and stored under different ageing conditions for up to 5 months.

Thus, two batches of rifampicin (samples 11 and 12, according to the invention) were placed under nitrogen atmosphere in an antistatic LDPE bag that had been previously purged with nitrogen, and the bag was twisted and tied in an airtight manner with a plastic strip.

The first bag was then placed inside a second antistatic LDPE bag, still under nitrogen atmosphere, and one porous sachet containing 5 g of silica gel and one porous sachet containing 100 $cm^3$ of a mixture of iron powder, zeolite and chelated carbon, were placed in the second bag which was then twisted and tied in an airtight manner with a plastic strip.

Finally, still under nitrogen atmosphere, the second bag was placed inside an aluminium pouch containing one porous sachets containing 5 g silica gel and one porous sachets containing 100 $cm^3$ a mixture of iron powder, zeolite and chelated carbon. The aluminium pouch was then heat-sealed.

The packaged batches were then placed in a HDPE drum and kept for up to 3 months at the following conditions:

at a temperature of 25±2° C. and relative humidity of 60%±5%; or at a temperature of 40±2° C. and relative humidity of 75%±5%;

Table 1 below shows the MeNP content, determined by liquid chromatography-mass spectrometry (LC-MS), detected in batches 11-12 before packaging (t0), and at different ageing time points.

TABLE 1

| Storage conditions | Time point | MeNP amount (ppm) I1 | MeNP amount (ppm) I2 |
|---|---|---|---|
| — | t0 | 0.0694 | 0.1275 |
| 25 ± 2° C./ | 1 month | 0.0677 | 0.1215 |
| 60% ± 5% RH | 3 months | 0.0769 | 0.1188 |
| 40 ± 2° C./ | 1 month | 0.0711 | 0.1104 |
| 75% ± 5% RH | 3 months | 0.0688 | 0.1098 |

From the data summarized in Table 1 it is evident that the use of the packaging assembly of the invention, and in particular of the moisture absorbing and oxygen-scavenging agents under inert atmosphere, allows to maintain the amount of MeNP constant over time.

Of note, this results in the rifampicin remaining compliant with the indications from regulatory agencies for up to three months, i.e. a maximum content of MeNP of 0.16 ppm, even when the starting content of MeNP is of about 0.13 ppm (sample 12).

On the other hand, batches having a starting content of MeNP of about 0.07 ppm stored with a similar packaging but without the inert atmosphere, and without the use of oxygen-scavenging and moisture absorbing agents, quickly became non-compliant during storage.

The invention claimed is:

1. A packaging method for control of formation of nitrosamine in a solid active pharmaceutical ingredient (API), the packaging method comprising:

providing the solid API with a predetermined starting content of a nitrosamine selected from the group consisting of 1-methyl-4-nitrosopiperazine, 1-cyclopentyl-4-nitrosopiperazine, and N-Nitroso-3-azabicyclo [3.3.0]octane;

loading, under a first inert atmosphere, the API in a first bag that comprises a first thermoplastic material, and closing the first bag;

placing, under a second inert atmosphere, the closed first bag, a first oxygen-scavenging agent, and a first moisture-absorbing agent in a second bag that comprises a second thermoplastic material, and closing the second bag; and placing, under a third inert atmosphere, the closed second bag, a second oxygen-scavenging agent, and a second moisture-absorbing agent in a third bag that comprises an aluminium-based material, and sealing the third bag;

wherein when the nitrosamine is 1-methyl-4-nitro sopiperazine, the predetermined starting content is less than or equal to 0.16 parts per million (ppm), wherein when the nitrosamine is 1-cyclopentyl-4-nitrosopiperazine, the predetermined starting content is less than or equal to 0.1 ppm, and wherein when the nitrosamine is N-Nitroso-3-azabicyclo [3.3.0]octane, the predetermined starting content is less than or equal to 2 ppm.

2. The packaging method of claim 1, wherein the API is selected from rifampicin, rifapentine, gliclazide, and salts and hydrates thereof.

3. The packaging method of claim 1, wherein the API is rifampicin, and wherein the nitrosamine is 1-methyl-4-nitrosopiperazine.

4. The packaging method of claim 1, wherein he predetermined starting content of the 1-methyl-4-nitrosopiperazine is greater than or equal to 0.01 ppm and less than or equal to 0.10 ppm.

5. The packaging method of claim 1, wherein the first thermoplastic material is a first thermoplastic polyethylene-based material, and/or wherein the second thermoplastic material is a second thermoplastic polyethylene-based material.

6. The packaging method of claim 1, wherein the first bag and the second bag are closed in an airtight manner by closing means or plastic strips or are sealed.

7. The packaging method of claim 1, wherein the third bag is sealed in an airtight manner.

8. The packaging method of claim 1, wherein the first inert atmosphere is an atmosphere saturated with a first inert gas, wherein the second inert atmosphere is an atmosphere saturated with a second inert gas, and wherein the third inert atmosphere is an atmosphere saturated with a third inert gas.

9. The packaging method of claim 1, wherein the first oxygen-scavenging agent and the second oxygen-scavenging agent are independently selected from:

a mixture comprising iron powder, zeolite, and chelated carbon;

a mixture comprising iron powder and calcium hydroxide;

a mixture comprising iron powder, sodium chloride, and activated carbon; and mixtures thereof.

10. The packaging method of claim 1, wherein the first moisture-absorbing agent and the second moisture-absorbing agent are independently selected from silica gel, calcium chloride, activated molecular sieves, activated carbon, and mixtures thereof.

11. The packaging method of claim 1, wherein the first thermoplastic material is the same as the second thermoplastic material.

12. The packaging method of claim 1, wherein the first oxygen-scavenging agent is the same as the second oxygen-scavenging agent.

13. The packaging method of claim 1, wherein the first moisture-absorbing agent is the same as the second moisture-absorbing agent.

14. The packaging method of claim 8, wherein the first inert gas is the same as the second inert gas, wherein the first inert gas is the same as the third inert gas, wherein the second inert gas is the same as the third inert gas, or wherein the first inert gas is the same as the second inert gas and the third inert gas.

15. A first assembly for control of formation of nitrosamine in a solid active pharmaceutical ingredient (API), the first assembly comprising:

a first bag comprising a first thermoplastic material, containing the solid API having a predetermined starting content of a nitrosamine selected from the group consisting of 1-methyl-4-nitro sopiperazine, 1-cyclopentyl-4-nitrosopiperazine, and N-Nitroso-3-azabicyclo[3.3.0]octane, and filled with a first inert gas and closed;

a second bag comprising a second thermoplastic material, containing the first bag, a first oxygen-scavenging agent, and a first moisture-absorbing agent, and filled with a second inert gas and closed; and a third bag comprising an aluminium-based material, containing the second bag, a second oxygen-scavenging agent, and a second moisture-absorbing agent, and filled with a third inert gas and sealed;

wherein when the nitrosamine is 1-methyl-4-nitro sopiperazine, the predetermined starting content is less than or equal to 0.16 parts per million (ppm), wherein when the nitrosamine is 1-cyclopentyl-4-nitrosopiperazine, the predetermined starting content is less than or equal to 0.1 ppm, and wherein when the nitrosamine is N-Nitroso-3-azabicyclo [3.3.0]octane, the predetermined starting content is less than or equal to 2 ppm.

16. The first assembly of claim 15, wherein the API is rifampicin, and wherein the nitrosamine is 1-methyl-4-nitrosopiperazine.

17. A second assembly, comprising:

the first assembly of claim 15; and a drum, filled with a fourth inert gas, containing the first assembly.

18. The second assembly of claim 17, wherein the fourth inert gas is the same as the first inert gas, wherein the fourth inert gas is the same as the second inert gas, wherein the fourth inert gas is the same as the third inert gas, wherein the fourth inert gas is the same as the first inert gas and the second inert gas, wherein the fourth inert gas is the same as the first inert gas and the third inert gas, wherein the fourth inert gas is the same as the second inert gas and the third inert gas, or wherein the fourth inert gas is the same as the first inert gas, the second inert gas, and the third inert gas.

19. A process for control of formation of nitrosamine in a solid active pharmaceutical ingredient (API) using an assembly, the API having a predetermined starting content of a nitrosamine selected from the group consisting of 1-methyl-4-nitrosopiperazine, 1-cyclopentyl-4-nitrosopiperazine, and N-Nitroso-3-azabicyclo[3.3.0]octane, wherein the assembly comprises:

a closable first bag comprising a first thermoplastic material;

a closable second bag comprising a second thermoplastic material;

a sealable third bag comprising an aluminium-based material;

a first oxygen-scavenging agent;

a first moisture-absorbing agent;

a second oxygen-scavenging agent; and a second moisture-absorbing agent;

wherein the process comprises, under inert atmosphere:

loading the API in the first bag, and then closing the first bag;

placing the closed first bag, the first oxygen-scavenging agent, and the first moisture-absorbing agent in the second bag, and then closing the second bag; and placing the closed second bag, the second oxygen-scavenging agent, and the second moisture-absorbing agent in the third bag, and then sealing the third bag;

wherein when the nitrosamine is 1-methyl-4-nitro sopiperazine, the predetermined starting content is less than or equal to 0.16 parts per million (ppm), wherein when the nitrosamine is 1-cyclopentyl-4-nitrosopiperazine, the predetermined starting content is less than or equal to 0.1 ppm, and wherein when the nitrosamine is N-Nitroso-3-azabicyclo [3.3.0]octane, the predetermined starting content is less than or equal to 2 ppm.

20. The process of claim 19, wherein an amount of the nitrosamine in the API remains less than or equal to the predetermined starting content for at least 6 months of storage.

* * * * *